United States Patent [19]

Bergsma

[11] Patent Number: 4,718,278
[45] Date of Patent: Jan. 12, 1988

[54] PRESSURE TRANSDUCER WITH IMPROVED CALIBRATION

[75] Inventor: Rudolph Bergsma, Ann Arbor, Mich.

[73] Assignee: Hi-Stat Manufacturing Co., Inc., Sarasota, Fla.

[21] Appl. No.: 857,273

[22] Filed: Apr. 30, 1986

[51] Int. Cl.$^4$ .................. G01L 9/02; G01L 19/02; G01L 7/08; G01L 27/00

[52] U.S. Cl. .................. 73/725; 73/4 R; 73/711; 73/866.1; 338/42

[58] Field of Search .............. 73/4 R, 711, 725, 753, 73/866.1; 338/42

[56] References Cited

U.S. PATENT DOCUMENTS

| | | | |
|---|---|---|---|
| 2,869,371 | 1/1959 | Kinderman et al. | 73/866.1 |
| 2,953,929 | 9/1960 | Kautz | 73/4 R X |
| 3,208,264 | 9/1965 | Melton | 73/4 R |
| 3,720,090 | 3/1973 | Halpert et al. | 73/4 R |
| 3,753,199 | 8/1973 | Rice | 338/42 |
| 3,961,520 | 6/1976 | Modgling | 73/4 R |
| 4,009,604 | 3/1977 | Taber et al. | 73/4 R |
| 4,079,351 | 3/1978 | Levine | 73/723 X |
| 4,193,054 | 3/1980 | Reis | 338/42 |
| 4,365,406 | 12/1982 | Neill et al. | 73/4 R X |
| 4,519,256 | 5/1985 | Daniels | 73/4 R X |

*Primary Examiner*—Tom Noland
*Attorney, Agent, or Firm*—Rhodes and Boller

[57] ABSTRACT

A pressure transducer comprises a movement which has separate span and set-point calibrations. A subsequent calibration of the span does not adversely influence a previous calibration of the set-point. Sensed pressure is reflected as arcuate motion of a crank mechanism along a resistor. The span calibration is performed by adjusting the position of the resistor in relation to the crank's pivot. The pivotal mounting of the crank is provided by a pivot member disposed within a slot. Adjusters in transverse slots which intersect the pivot mounting slot act upon the pivot member to establish the set-point calibration. The transducer is especially well suited for fabrication and calibration by automated equipment.

28 Claims, 15 Drawing Figures fig. 1

Fig. 2 fig. 3 fig. 7 fig. 6 fig. 4 fig. 5 fig. 8 fig. 9 fig. 10 fig. 12 fig. 11 fig. 14   fig. 13   fig. 15

PRESSURE TRANSDUCER WITH IMPROVED CALIBRATION

BACKGROUND AND SUMMARY OF THE INVENTION

This invention relates generally to pressure transducers. More specifically it relates to a pressure transducer having improved calibration, particularly a pressure transducer which is to be mass-produced.

Pressure transducers are utilized in electrical or electronic circuits to provide pressure information input in the form of an electrical signal. While accuracy and reliability are always important considerations for a transducer, certain uses of pressure transducers include cost of the transducer as an important consideration. For example this is the case in the automobile industry.

Today's automobiles utilize electronic microprocessor based systems for information and control. The development of electronic technology has achieved significant cost-reductions and reliability improvements enabling acceptance by the automotive industry for mass production usage.

It is probably fair to state that automotive sensor development has not kept pace with that of electronics. This is not necessarily for lack of available sensors; rather the cost may have restricted the extent to which some sensors are used, or sensors themselves may lack the ability to meet the demanding performance specifications of the automobile industry. For a pressure transducer to meet acceptance for automotive use, it must be rugged, possess a reasonable degree of accuracy, have the proper package size, and be cost-effective.

One way to make a pressure transducer more costeffective in a mass production application is to automate its assembly and calibration to the fullest extent possible while still retaining its ability to meet performance specifications, and the present invention is directed to a new and unique pressure transducer which possesses these capabilities. It has a construction with an improved calibration adapted for massproduction by automated assembly and calibration procedures.

In a preferred embodiment the invention comprises an organization and arrangement of individual component parts which are cooperatively associated to enable the transducer's set point to be calibrated by automatic calibration equipment. For many uses of the transducer the set point calibration will be sufficient as the sole calibration step because the sizes and manufacturing tolerances on those component parts which affect accuracy will inherently yield an accurate calibration for the span as well. However, an extended aspect of the invention also contemplates the use of automatic calibration equipment to perform both set-point and span calibration steps in a manner whereby performance of one does not adversely influence the other. In other words for example, a span calibration step does not impair the set-point established by a preceding set-point calibration step.

The improved calibration of the pressure transducer of the invention is accomplished by means of an adjusting device, or devices, having interaction with the movement of the transducer in such a way that undesirable effects such as hysteresis, springback and the like are virtually eliminated. When both the set-point and the span are to be calibrated, such calibration is attained by independent steps which have no adverse interaction. In one preferred embodiment to be described, the calibration procedure comprises the set-point adjustment performed first, followed by the span adjustment; however, as noted, set-point calibration alone may be sufficient for many applications.

Moreover, the fabrication and assembly of individual component parts are accomplished by an efficient way so that there are a comparatively small number of component parts to be assembled together and the parts themselves can be fabricated by conventional techniques. For example, by making certain parts out of plastic, they can be fabricated by conventional plastic fabrication techniques, such as injection molding. Other parts can be fabricated by other conventional techniques such as stamping and forming.

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

The pressure transducer shown in the drawings is designated by the general reference numeral 10, and it comprises a metal base 12, a cylindrical plastic body part 14 and a cylindrical plastic body part 16. The base 12 and the two body parts 14 and 16 form the housing of the pressure transducer. The parts 12, 14 and 16 are coaxial with the main longitudinal axis 18 and each has a generally circular cylindrical shape in transverse cross section.

Base 12 has an externally threaded nipple 20 at one axial end forming the pressure sensing port. Pressure transducer 10 is adapted to be mounted on an object having a threaded opening at which pressure is to be sensed by threading nipple 20 into the threaded opening in the object.

The axial end of base 12 opposite nipple 20 is secured to one axial end of body part 14 and a diaphragm 22 of circular shape is disposed between them. The outer perimeter margin of diaphragm 22 is held between an internal circular shoulder 24 formed in base 12 and a circular lip 26 projecting axially from the lower end of body part 14. In the particular embodiment of pressure transducer illustrated, a circular metal ring 28 fits over lip 26, and it is the metal ring which actually bears against the outer perimeter of diaphragm 22. The forceful retention of the diaphragm's outer perimeter margin is accomplished by crimping a flange 30 at the free end of base 12 onto an external circular shoulder 32 which is formed in body part 14 slightly beyond lip 26. With this retention, diaphragm 22 is securely held between the parts 12 and 14 to form a moveable transverse wall which separates the pressure sensing port from the internal transducer movement which will be subsequently described. The diaphragm is fabricated from any conventional material which is leakproof to prevent pressure fluid introduced at the sensing port from intruding into the interior of the transducer's movement, and yet which permits the effect of sensed pressure to be transmitted to the movement without any significant impairment.

The pressure which is sensed by the pressure sensing port acts through diaphragm 22 on an actuator 34. Actuator 34 has a generally circular shaped head 35. A pair of legs 36 project from head 35 on diametrically opposite sides. These legs extend through corresponding slots 38 in internal portions 40 of body part 14. The engagement of legs 36 with slots 38 serves to guide actuator 34 for substantially straight line motion on axis 18 in response to changes in the sensed pressure, thereby minimizing any tendency of the head toward tipping.

Figure 1:
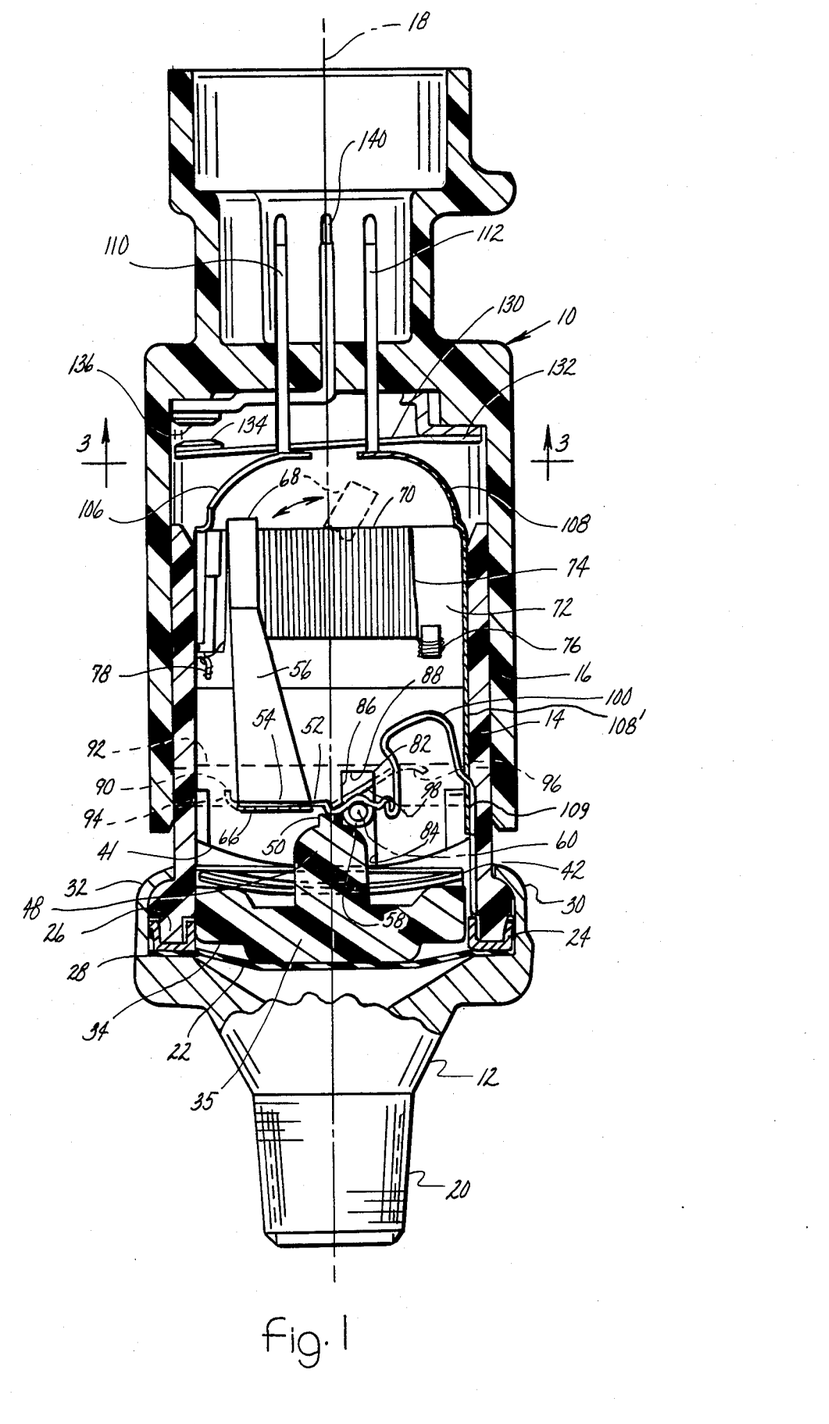
FIG. 1 is a longitudinal cross sectional view through a presently preferred embodiment of transducer embodying principles of the present invention.
Figure 2:
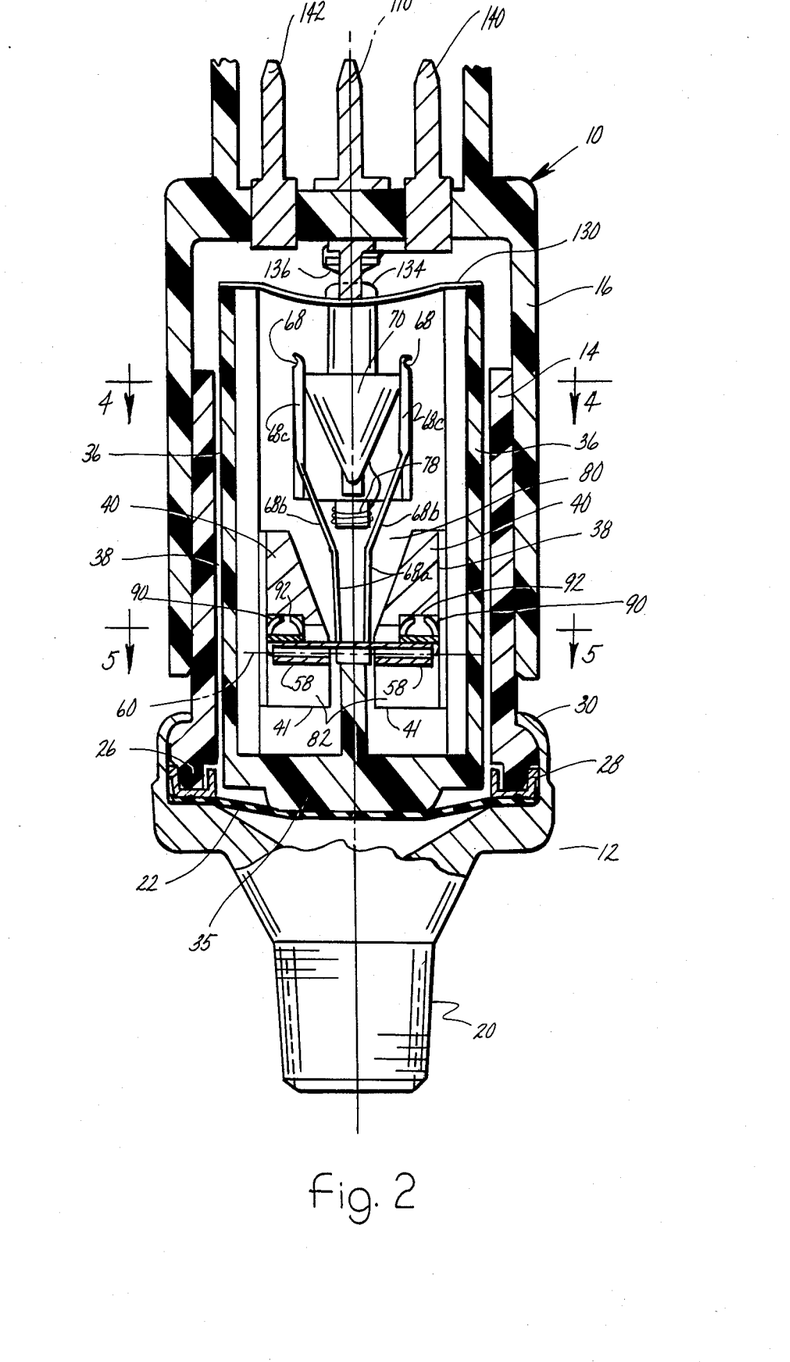
FIG. 2 is a view similar to FIG. 1 but taken at 90° relative to the view of FIG. 1.
Figures 3, 4, 6, 7:
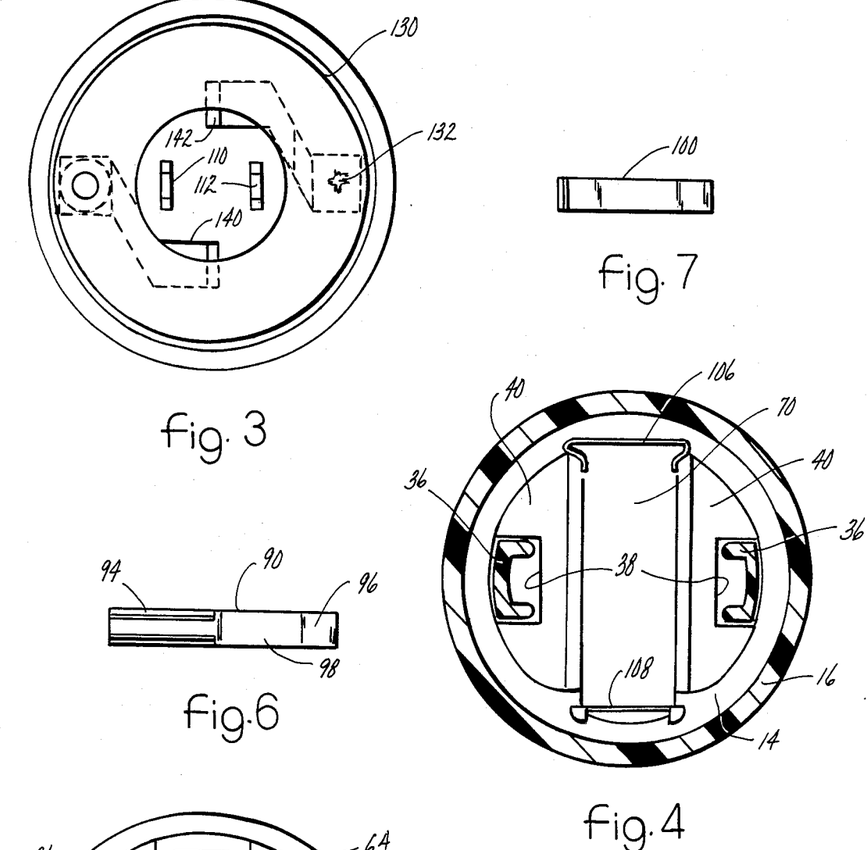
FIG. 3 is a transverse view taken substantially in the direction of arrows 3—3 in FIG. 1.
FIG. 4 is a transverse view taken substantially in the direction of arrows 4—4 in FIG. 2.
FIG. 6 is a plan view of one of the component parts shown by itself.
FIG. 7 is a plan view of another component part shown by itself.

The axial end 41 of portions 40 which faces toward actuator 34 is convexly contoured. A stack 42 of one or more springs is shown in FIG. 1 only disposed between end 41 and head 35. The particular selection of the spring characteristics is chosen to produce the desired response characteristic of the transducer, and spring stack design is conventional. As can be seen in FIG. 1, the outer periphery of head 35 bears against spring stack 42. The position of FIGS. 1 and 2 represent a nominal position (i.e. ambient pressure being sensed) where the spring stack is essentially fully relaxed. In this position actuator 34 assumes its nominal position, and in this nominal position diaphragm 22 assumes the position shown.

In response to increasing pressure at the pressure sensing port, the diaphragm 22 and actuator 34 will be urged upwardly in FIGS. 1 and 2, with the movement being resisted by the force of the spring stack as the stack is increasingly stressed. The extent of upward axial displacement of the actuator for a given spring stack is a function of the pressure applied to the pressure sensing port. As the pressure continues to increase, the spring stack increasingly deflects with the limit of travel being reached when the deflected stack is fully pressed against the convex end 41. The convex shape prevents overstressing of the stack. Thus for a given spring stack characteristic the positioning of the actuator is correlated with a particular pressure range. By varying the spring stack characteristics, it is possible to vary this pressure range.

Head 35 also contains a central projection 48 on the face opposite diaphragm 22. Projection 48 terminates in a small tip 50 as shown in FIG. 1. The spring stack is configured not to interfere with projection 48.

Figure 5:
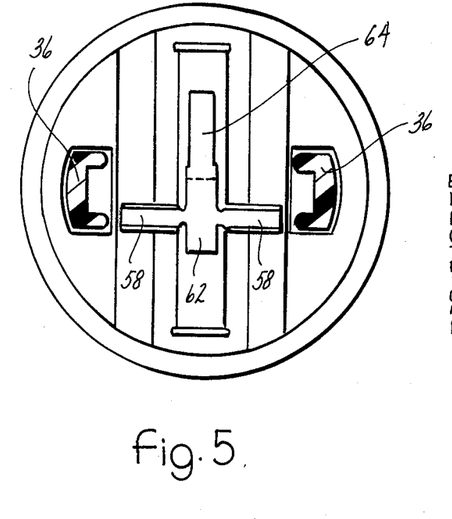
FIG. 5 is a transverse view taken substantially in the direction of arrows 5—5 in FIG. 2.

Actuator 34 acts via tip 50 on a crank mechanism 52. Crank mechanism 52 comprises a pivot member 54 and a wiper member 56. Pivot member 54 is preferably fabricated as a metal piece, stainless steel is a suitable material, and as viewed in FIG. 5 it may be considered to have a generally cruciform shape. Transverse portions 58 of member 54 are rolled into essentially circular shapes to form a pivot which provides for pivoting of the member about a pivot axis 60. The longitudinal portions 62, 64 may be considered as crank arms.

Wiper member 56 is a resilient metal piece and in FIG. 1 is seen to have a base 66 which is disposed against and joined to arm 64. It further comprises wiper blades 68 which project (FIG. 2) away from base 66 on opposite sides of arm 64. The portions 68a of blades 68 which are proximal to base 66 are generally parallel but diverge slightly. Intermediate portions 68b of the blades diverge more noticeably, and the distal end portions 68c serve to provide contact surfaces which bear from opposite directions on an electric circuit element 70. The disclosed embodiment of electric circuit element 70 is a triangular shaped resistor, as can be seen in FIG. 2.

Wiper member 56 is formed from a resiliently flexible material which has a good electrical conductivity and which can act on the resistor with good electrical contact but without creating undesired wear on either the resistor or the wiper blades themselves. The drawing figures show the wiper member in the flexed condition where the blades are spread apart. This creates the forceful contact against the opposite sides of the resistor. The blade flexing tends to take place in a generally cantilever fashion. In its free condition disassembled from the transducer, the wiper member assumes a more closed position where the distal ends of the blades are almost in contact with each other.

Resistor 70 can be fabricated by conventional techniques. It comprises a non-conductive core 72, glass-filled phenolic for instance, which forms the triangular cross sectional shape and a resistor wire 74 which is wound around the outside of the core along the core's length. The ends of the resistor wire have respective terminations 76 and 78 (FIG. 1) enabling the resistor to selectively connect with the external circuit when the transducer is put to use. In transducer 10, only termination 78 is connected (see FIG. 1) for reasons which will be explained later.

The two internal body portions 40 are integrally formed with body part 14 during molding. They are separated by a slot 80 which extends diametrically across part 14. The general cross sectional shape of slot 80 is that of a funnel as can be seen in FIG. 2.

A further slot 82 is provided in portions 40. The slot is open at the end surfaces 41 and extends parallel to axis 18 as viewed in FIG. 1. It comprises an end wall 88 which is opposite the slot's opening at end surfaces 41 and side walls 84 and 86 which are parallel to axis 18. The distance between the two side walls 84 and 86 is just slightly greater than the outside diameter of the pivot portions 58 of pivot member 54. This allows the pivot member to be assembled to the housing part 14 by registering the pivot portions 58 with the open end of the slot at end surfaces 41 and moving portions 58 into slot 82. Slot 80 provides space for the arm portions 62, 64.

The extent to which the pivot portions 58 can be inserted into slot 82 is controlled by a pair of adjusters 90. Body part 14 is further provided with a pair of parallel apertures 92 and it is within each of these two apertures 92 that a corresponding one of the adjusters 90 is disposed. Apertures 92 are transverse to axis 18 but they do not lie on a diameter. Rather they lie on parallel chords, and they intersect slot 82. In other words, each aperture 92 extends through a corresponding internal portion 40, and in so doing intersects slot 82. Specifically each adjuster 90 is disposed to act upon a corresponding one of the pivot portions 58 of pivot member 54.

The adjusters are figured for forceful fits within apertures 92. The adjusters are preferably formed metal parts and each comprises a first portion 94 disposed within the corresponding aperture 92 to one side of slot 82 as viewed in FIG. 1 and another portion 96 which is disposed to the opposite side of slot 82. An intermediate portion 98 of the adjuster spans slot 82 at an acute angle. The illustrated embodiment of aperture 92 has a non-circular cross section, rectangular to be specific.

Because the intermediate portion 98 of each adjuster 90 spans slot 82 at an acute angle, the axial position of each adjuster 90 within the corresponding aperture 92 controls how far the corresponding pivot portion 58 can be inserted into slot 82. For example if the adjuster 90 illustrated in FIG. 1 were to be moved within its aperture 92 toward the left, this would permit the pivot to be inserted further into slot 82 toward wall 88. If it were moved to the right, the extent to which the pivot could be inserted would be less. Besides changing the extent to which the pivot can be inserted, the adjuster is also effective to cause a slight change in the angular location about axis 60 at which the pivot portion 58 has its line of contact with the intermediate portion 98 of the adjuster. This is because pivot portion 58 is circular. It is the ability to set the dimension, as measured axially of the transducer, between axis 60 and the point of contact of actuator tip 50 with the pivot member which is utilized in performing a set-point adjustment for the transducer, as will be subsequently explained in greater detail.

In the assembled transducer, actuator 34 acts on pivot member 54 in the manner shown. A spring member 100 is also preferably associated with the transducer movement so as to bias the pivot member in a sense which will resist motion imparted to actuator 34 in response to increasing sensed pressure. The spring member has a general U-shape and one end of the U is suitably secured with respect to the transducer housing and the opposite end is hooked so as to provide a connection with the distal end of arm portion 64. Hence as viewed in FIG. 1, spring member 100 is effective to urge the pivot member in the counterclockwise sense about axis 60. The strength of the spring force is just sufficient to maintain pivot member 54 in contact with tip 50 of actuator 34 so that the crank mechanism faithfully follows the positioning of the actuator member in response to sensed pressure changes, and it has no major interaction with stack 42.

From consideration of the foregoing description, it is believed that the reader can now appreciate that the action of the actuator on the crank mechanism will serve to increasingly pivot the crank mechanism about axis 60 in response to increases in sensed pressure. Accordingly, the wiper blades will move along an arcuate path of travel which is concentric with axis 60. It is this arcuate motion which takes place in the contact of the wiper blades with the resistor. FIG. 1 shows a broken line position for the wiper blades at maximum sensed pressure. The size of the distal end portions 68c of wiper blades 68 is sufficiently large that contact is maintained between the wiper blades and the opposite sides of the resistor throughout the arcuate range of travel of the crank mechanism.

Transducer 10 comprises contacts 106, 108 which are formed conductive elements disposed diametrically opposite each other. The drawings illustrate a representative mounting which provides for the axial positioning of the core on part 14, hereinafter discussed. Termination 78 is joined to contact 106.

The two contacts in turn make connection with respective terminals 110, 112 mounted in a particular geometrical configuration on one end of body part 16.

Wiper member 56 forms a means to pick a selectable proportion of the resistor. It is arranged to have an interaction with an external electric circuit whereby the selectable proportion of the resistor provides the electrical signal input to the circuit. By connecting the wiper with contact 108 the selectable proportion of the resistance presented across terminals 110 and 112 to an external circuit connected thereto comprises that portion of resistor 70 between termination 78 and the point of contact of the wiper with the resistor.

FIG. 1 illustrates the circuit path from wiper member 56 to contact 108. The path comprises wiper member 56, pivot member 54, and spring member 100 to a conductive extension 108' of contact 108 on which one end of spring member 100 is mounted at 109.

With the wiper in the solid line position shown in FIGS. 1 and 2, essentially low resistance of the resistance wire is presented to the external electrical circuit via terminals 110, 112. As the mechanism is operated in the clockwise sense as viewed in FIG. 1, the amount of resistance which is presented across terminals 110, 112 increases.

For a certain range of sensed pressures the wiper member will execute a certain range of arcuate travel. This is referred to as the pressure span, and therefore for a given characteristic of the spring stack, the arcuate positioning of the wiper member is correlated with the pressure span.

In order to correlate the electrical span with the pressure span, resistor 70 is made adjustably positionable on housing part 14. The direction of adjustable positioning is along the length of axis 18. The closer the resistance is positioned toward axis 60, the smaller the electrical span for a given arcuate span of travel of wiper member. Positioning of the resistor in the opposite direction will increase the electrical span. Therefore the transducer is endowed with the ability to have its electrical span calibrated in correlation with the pressure span by simply axially positioning the resistor on body part 14.

Of course it is to be appreciated that the basic characteristics of the transducer are inherent by the particular design for a given use of the transducer and that the purpose of the calibration procedure is to perform slight adjustment creating the highest degree of precision for the set-point and the span. In the illustrated embodiment, contact 106 moves axially with the core at its point of mounting on the core, and the opposite end of the core slides along the extension 108' of contact 108 during the axial positioning of the resistor on the housing part 14.

The set-point calibration refers to the setting a desired resistance between one of the terminals 110, 112 and a point at which the wiper member makes contact with the resistor. The invention contemplates that the set-point occur with the wiper member parallel to the direction of adjustment of resistor 70 on part 14, i.e. essentially parallel to axis 18. While the adjusters 90 are selectively positioned within apertures 92 to establish the precise calibration of the set-point by setting the pivot position of the crank mechanism, this calibration takes place with the wiper member substantially parallel to the axis 18.

Once the set-point calibration has been performed, the span is calibrated. This is done by applying a certain pressure to the sensing port to operate the crank mechanism over a corresponding arcuate range, so that as a result the wiper member is no longer essentially parallel to the direction of adjustment of resistor 70 on body part 14. The axial positioning of the resistor with respect to body part 14 therefore becomes effective to vary the point along the resistor at which the wiper blades make electrical contact. In this way the electrical span is set to precise correspondence with the pressure span. When the pressure returns to the set-point value, so does the electrical signal regardless of how much or how little the resistor has been adjusted to set the electrical span.

Thus the two calibrations can be separately performed without the span calibration influencing the previous set-point calibration.

Figure 8:
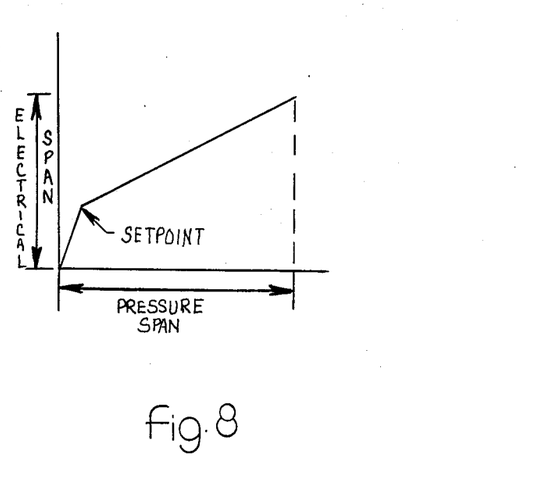
FIG. 8 is a graph plot useful in explaining principles of calibration.

FIG. 8 graphically portrays the characteristics.

The transducer is well adapted to automated assembly and calibration procedures. Moreover the adjustments are substantially immune to potentially adverse effects such as hysteresis, spring-back etc. For example the nature of the forceful fit of the adjusters 90 within the apertures 92 is such that they can be positioned within the apertures to any desired position and when so positioned will remain there. The intermediate portion of each adjuster which spans slot 82 is sufficiently stiff and it is not subject to undesired deflections. Therefore once the appropriate setting of the adjusters has been made, there is full assurance that the set point calibration will remain true. This renders the calibration particularly suited for automatic procedures such as advancing external pushers in unison into apertures 92 to advance the adjusters 90 in unison until a desired set-point calibration is achieved. The calibration is performed prior to assembly of housing part 16. The contacts 106, 108 can be connected to external equipment to monitor the resistance during the calibration.

Likewise when the span calibration is performed the resistor can be increasingly inserted into the housing part 14 until the desired span is achieved. The resistor has a forceful fit with respect to housing part 14 so that once the span calibration has been made, it remains true. In other words, repeated back and forth adjustments hunting for the correct combination of adjustments will become unnecessary.

The length of the legs of the actuator insures nontilting action for improved motion consistency and diaphragm life. It also assists in achieving consistent action on the pivot member.

The spring stack may be set to provide a more rapid action at lower pressures and a slower action at increased pressures. For example there may be a greater displacement from say 0 to 10 psi and a slower action from 10 to 100 psi.

If desired, the calibrated settings may be locked in place by an additional means such as a locking device, adhesive or something of that nature. However in most instances this should be unnecessary.

The illustrated configuration has been described for a positive characteristic where there is increasing resistance presented by the transducer in response to increasing pressure.

The illustrated embodiment also includes an associated switch. The switch configuration is a normally open one which is closed when a predetermined pressure is sensed. This switch may be used independently of or in conjunction with the control circuitry with which the variable resistance is used. The illustrated switch has an annular blade member 130 suitably supported at 132 on the housing part 16 and disposed to be actuated by legs 36. When a certain pressure is sensed, the ends of the legs deflect blade 130 causing its contact 134 to make with the fixed contact 136. The calibration of the switching point is performed by providing the two housing parts 14 and 16 with a telescoping capability. The switch calibration is set by the amount of telescoping, and is performed after the set-point and span calibrations. After the switch has been calibrated, it is preferable to join the two body parts, for example by a thermoset adhesive.

The switch calibration may have a certain amount of interaction with the transducer calibration but this is deemed unobjectionable for typical uses. The interaction occurs because the force required to operate the annular blade member 130 is derived from actuator 34 and therefore the resistance characteristic of blade member 130 is additive to the characteristic of spring stack 42. The extent to which there is interaction will depend upon the particular design for the particular usage involved.

It is also to be noted that the telescopic adjustment between the two housing parts is taken into account in the design of contacts 106, 108. These two contacts are provided with curved ends which project from the ends of the resistor core to make contact with the interior ends of the two terminals 110, 112. Since these latter terminals are fixedly mounted on the housing part 16, they will move axially in relation to the resistor as the two housing parts are telescoped. However over the range of telescoping, the contacts will deflect to take into account the telescoping action so that good electrical conductivity between the contacts and the terminals is assured for any amount of telescoping of the two body parts within the design range. Even if there is a certain amount of deviation of one contact 106, 108 from the other in their free unflexed conditions, due to a particular span adjustment for example, they are designed to be contacted by terminals 110, 112 when part 16 is telescoped onto part 14.

Contact 136 is mounted on a terminal 140 which is itself fixedly mounted on the end wall of body part 16. The annular blade 130 has electrical continuity to another terminal 142 mounted on the end of body part 16 so that the four terminals 110, 112, 140, 142 form a particular geometrical configuration for connection with a mating connector plug (not shown).

One application of the pressure transducer of the invention is as an engine oil pressure unit on an automobile engine. Nipple 20 can be threaded into a suitable threaded aperture in the engine so as to be in communication with the pressurized oil which is delivered by the engine's lubricating system. The terminals 110 and 112 may be connected to a circuit whereby the transducer movement will provide a signal correlated with engine oil pressure so that a measurement of sensed oil pressure can be given. The switch terminals 140, 142 may be connected to a vehicle control circuit, and when a certain pressure is sensed, the switch contacts close to operate the control circuit.

Figure 9:
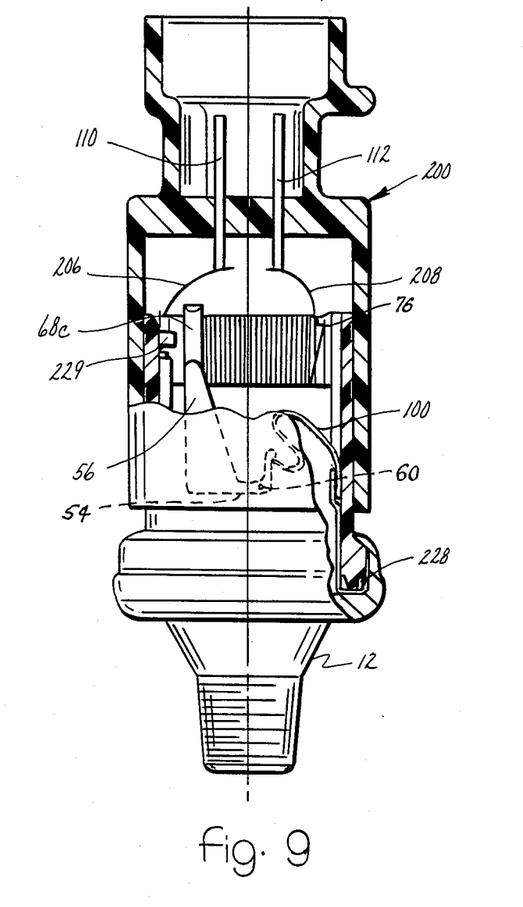
FIG. 9 is a view similar to FIG. 1 of a second embodiment on a smaller scale.

FIG. 9 portrays a further embodiment of the invention, a pressure transducer 200 embodying principles of the present invention. The general organization and arrangement of transducer 200 is like that of transducer 10 and therefore like reference numerals will serve to identify like components without the need for any detailed description.

Transducer 200 differs from transducer 10 in one respect in that it omits the switch contact and terminal structure which provides the high pressure sensing function. In other words it omits the components 130, 132, 134, 136, 140 and 142 of transducer 10.

Moreover pressure transducer 200 differs in that it provides a different manner for connecting the resistor and wiper in circuit and further includes a low pressure sensing switch function in association with the wiper.

Referring therefore in more detail to FIG. 9 the termination 76 is shown connected to contact 208, which replaces and has a slightly different configuration from contact 108. Contact 208 does not extend downwardly to an operative connection with the end of spring member 100 as was the case for transducer 10 in FIG. 1, but rather contact 208 connects to termination 76 of the resistance wire. Termination 78 is unconnected. Wiper 56 is connected to ground through base 12 in the following manner.

A ring 228 in transducer 200 is in substitution of ring 28 of transducer 10 and differs in configuration from ring 28. Although ring 228 has a channel-shaped cross section which serves the same purpose as the ring 28 in FIG. 1, the OD side of the channel is configured for electrical contacting engagement with base 12 in the assembled transducer. The ID side of the channel is extended to form a point of operative connection with the end of spring member 100. Since there exists circuit continuity from wiper member 56, through pivot member 54, and through the spring member 100 the construction provided by ring 228 and base 12 serves to ground wiper ember 56 through base 12.

In the typical usage of the pressure transducer nipple 20 is threaded into a corresponding threaded aperture at which oil pressure is sensed. Since the threaded mounting is to structure which is typically electrically grounded, the act of mounting the transducer in the threaded aperture serves to ground base 12.

In response to increasing pressure sensed by transducer 200 when in use, the effective resistance presented by the transducer at terminal 112 relative to ground progressively decreases. Hence this embodiment may be said to present a negative characteristic wherein the effective resistance presented decreases in response to increase in pressure. The particular characteristic curve of this relationship is determined by factors discussed earlier.

The low pressure sensing switch function is accomplished by providing tabs 229 formed from opposite sides of the portion of a contact 206, which is in substitution of contact 106. These tabs 229 project generally parallel with the length of the resistor in the direction of the wiper member. FIG. 9 shows the position with the portions 68c of wiper member 56 spaced slightly from tabs for purposes of clarity in illustration, and this would actually represent a sensed pressure slightly above zero psi. A small amount of counterclockwise motion of the wiper member from the illustrated position will cause the wiper member to contact tabs 229 to produce a ground at contact 206 and hence terminal 110. This represents the zero pressure condition. An indicator light (not shown) having one terminal connected to terminal 110 and the other terminal connected to a source of energizing potential will light under this condition to indicate low pressure. For all pressures above a certain threshold slightly above the zero pressure level the wiper is out of electrical contact with tabs 229 thereby removing the ground from terminal 110 and causing the indicator light to extinguish. In the described application this threshold pressure is relatively low and 3 psi is a typical example. Once the wiper leaves contact with the tabs it operates along the resistor in the manner described in connection with pressure transducer 10 so that a signal indicative of sensed pressure is provided at terminal 112.

Figure 10:
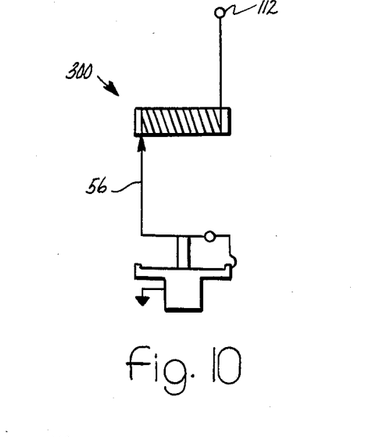
FIG. 10 is a schematic view representing a third embodiment.

FIG. 10 schematically portrays another configuration of the invention, a a pressure transducer 300. This configuration is like that of transducer 200 but omits the low pressure sensing switch function.

Figure 11:
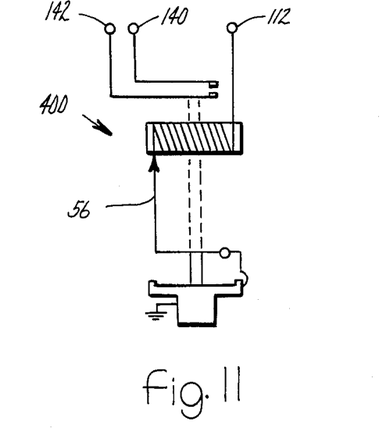
FIG. 11 is a schematic view representing a fourth embodiment.

FIG. 11 illustrates schematically a further embodiment of the invention, a transducer 400 which is like transducer 300 except that it also includes the high pressure sensing switch function of transducer 10.

Figure 12:
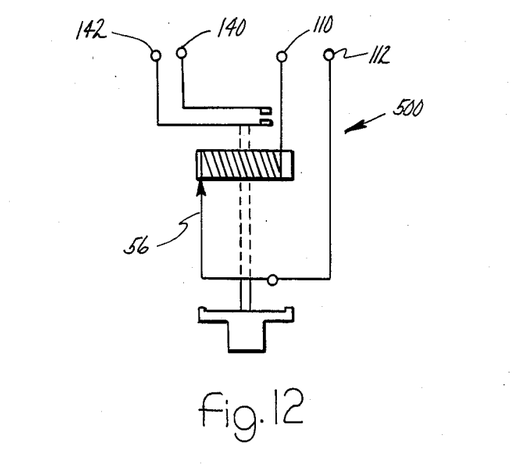
FIG. 12 is a schematic view representing a fifth embodiment.

FIG. 12 is a schematic representation of a further embodiment of the invention, a transducer 500 which is like transducer 400 except that instead of wiper member 56 being connected through the base, it is connected back to terminal 112 in the manner described in FIG. 1.

The transducers of FIGS. 9, 10, 11, and 12 all exhibit a decreasing resistance signal as sensed pressure increases.

Figures 13, 14, 15:
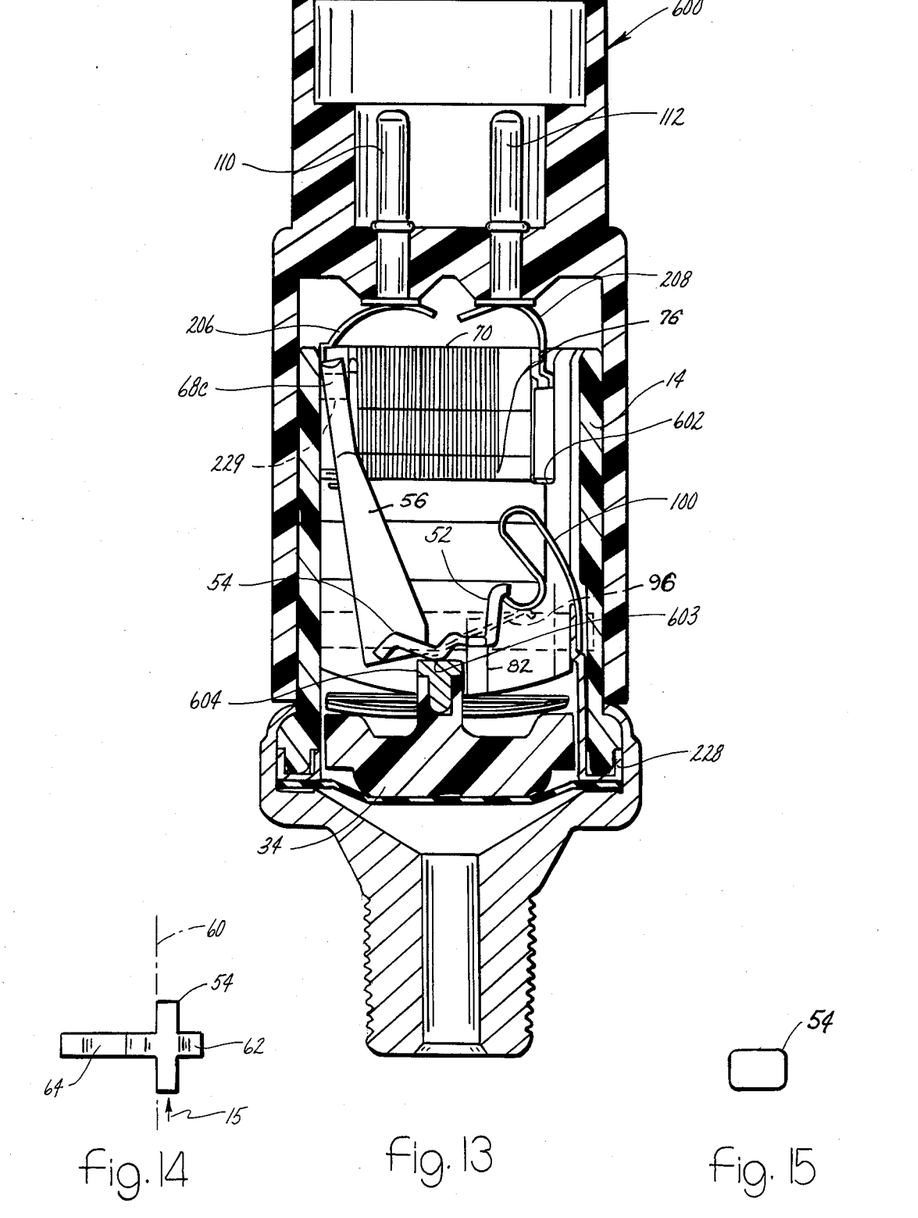
FIG. 13 is a view similar to FIG. 1 of a sixth embodiment.
FIG. 14 is a top plan view of one of the component parts of the transducer of FIG. 13 shown by itself.
FIG. 15 is an enlarged view in the direction of arrow 15 in FIG. 14.

FIG. 13 illustrates a still further embodiment of the invention, a transducer 600 which is in general like the embodiment 200 of FIG. 9. FIG. 13 is a view looking in the same direction as FIG. 9 and like parts in the two views are designated by like reference numerals. Although like reference numerals are used to identify like parts, there are certain observable differences in some details of the like numbered parts. For example the terminals 110, 112 in embodiment 600 are round pin type terminals rather than the flat blade terminals. Also FIG. 13 shows wiper member 56 in the position assumed when there is zero psi acting on the pressure sensing port. In this position the distal ends 68c of the wiper touch tabs 229 to provide circuit continuity from base 12 through ring 228, through spring member 100 and through pivot member 52 causing ground to be placed on terminal 110 at zero psi. In response to an initial pressure rise such as explained earlier, the wiper will move in the clockwise sense as viewed in FIG. 13 to come out of contact with tabs 229 thereby removing the ground from terminal 110 at which time the distal end 68c of the wiper member will be in contact with resistor 70. In response to increasing sensed pressure there will be decreasing resistance to ground at terminal 112.

Another difference in transducer 600 is that the span calibration is not performed. Resistor 70 and contacts 206, 208 are inserted as a unit into the open end of housing part 14 until the travel is arrested by abutment with an internal shoulder 602. As explained earlier, the size and manufacturing tolerances can be inherently satisfactory to provide an inherently accurate span calibration without performance of a separate span calibration step. It is to be observed that this accuracy is obtainable, at least in part, because shoulder 602 and the transducer movement are all referenced to the same housing part 14.

A still further difference is that the pivot member 54 in FIG. 13 has a different shape and construction from the pivot member 54 in the preceding FIGS. The pivot member 54 in embodiment 600 is formed by conventional metal working techniques from a blank of substantially uniform thickness. The member has a shape like that portrayed in FIG. 5 to comprise a shorter pivot arm portion 62 and a longer pivot arm portion 64. The distal end of the shorter portion 62 is hooked for engagement with the free end of spring member 100 and due to the change in shape, the spring member 100 also has a somewhat different shape from the spring member 100 of the earlier drawing FIGS.

The wiper is joined in any suitable manner to the longer pivot arm portion 64. The longer arm is also formed with a bend 603 against which the actuator 34 operates. Actuator 34 in embodiment 600 has a slightly different construction in that the point of action with the pivot member is slightly eccentric relative to the main transducer axis 18. It also has a metal wear button 604 at the end of projection 48 which makes contact with the bend 603 of the wiper member.

Still another difference in the construction of the pivot member is that the pivot portions 58 in the embodiment 600 are not of circular shape. Rather they are of solid rectangular cross sectional shape, preferably the corners of the rectangle are slightly radiused by a conventional manufacturing technique. This is seen in FIG. 15.

The general principle of operation is the same in that the spring member 100 will urge the pivot member counter-clockwise so that portions 58 interact with that portion of the adjusters which spans slot 82. By adjustment of the adjusters within their own slots the relative axial position of the pivot to the contact of button 604 with bend 603 will change in the same manner described earlier whereby the adjusters are effective to perform the set point adjustment. The pivot axis 60 is however not at the geometric center of the pivot, but rather at the upper left hand corner as viewed in FIG. 15.

What is claimed is:

1. In a pressure transducer comprising a pressure sensing port, an actuator which is selectively positionable along a straight linear axis in accordance with pressure sensed at said port, an electric circuit element having a length which is transverse to the positionable motion of the actuator, and a pick which is selectively positionable by the actuator along the length of the electric circuit element to cause the pressure transducer to present an electric circuit characteristic as a selectable portion of the electric circuit element in correlation with the sensed pressure, the improvement wherein the pick is coupled with the actuator by a mechanism which comprises a crank having a pivot and means constraining the pivot such that the crank is constrained in a pivotal mounting about a pivot axis transverse to the direction of the pick's positioning by the actuator, the pick is caused to swing in an arc about the pivot axis as the crank is operated by the actuator thereby causing the pick to execute an arcuate motion as it is selectively positioned over the length of the electric circuit element, and said means constraining the pivot comprises an adjusting device provided to act upon the crank's pivot for causing the pick to be set to a nominal setpoint position.

2. The improvement set forth in claim 1 in which the crank's pivot is disposed within an apertured portion of a body portion of the pressure transducer and wherein said adjusting device is disposed on said body portion and acts on said pivot at said apertured portion of said portion.

3. The improvement set forth in claim 2 including a further apertured portion extending in said body portion on opposite sides of said first-mentioned apertured portion, said adjusting device having respective portions disposed within said further apertured portion on opposite sides of said first-mentioned apertured portion, and said adjusting device having an intermediate portion which spans said first-mentioned apertured portion and acts on said pivot.

4. The improvement set forth in claim 2 in which said adjusting device comprises an adjusting means which is disposed within a further apertured portion of said body portion, the two apertured portions being transversely intersecting and said adjusting device being selectively positionable within said further apertured portion to act on said pivot to set the nominal set-point position of the pick.

5. The improvement set forth in claim 4 in which the first-mentioned apertured portion comprises a slot arranged parallel to the first-mentioned axis and having parallel wall spaced apart just slightly greater than the outside diameter of the pivot, said adjusting means acting on the pivot to react at least a portion of the force exerted on the pivot by the actuator.

6. The improvement set forth in claim 5 in which said further apertured portion comprises a pair of apertures respectively disposed at opposite sides of the point of action of the actuator on the crank, and wherein said adjusting means has respective adjusting portions disposed respectively in said pair of apertures.

7. The improvement set forth in claim 6 in which each of said adjusting portions is configured for a forceful fit in a corresponding one of said pair of apertures and comprises a first portion disposed to one side of the pivot, a second portion disposed to the opposite side of the pivot and an intermediate portion which bridges said first and second portions and acts on the pivot.

8. The improvement set forth in claim 7 in which said pair of apertures are arranged substantially at right angles to said slot, said intermediate portion of each of said adjusting portions being disposed at an acute angle to said pair of apertures and to said slot.

9. The improvement set forth in claim 1 in which said electric circuit element and said crank are relatively positionable in a direction along the first-mentioned axis toward and away from the pivot axis to selectively set the span of the electrical circuit characteristic presented by the transducer in correlation with a given span of sensed pressure and wherein for a given linear position of the actuator along said first-mentioned axis, the pick has an engagement with the electric circuit element which allows the electric circuit element to be positioned along said first-mentioned axis relative to the crank without any substantial effect on the corresponding selected portion of the electrical circuit presented as the electric circuit characteristic in the nominal set-point position of the pick thereby enabling the span to be set as desired without any substantial effect on the set point.

10. In a pressure transducer comprising a pressure sensing port, an actuator which is selectively positionable along a straight linear axis in accordance with pressure sensed at said port, an electric circuit element having a length which is transverse to the positionable motion of the actuator, and a pick which is selectively positionable by the actuator along the length of the electric circuit element to cause the pressure transducer to present an electric circuit characteristic as a selectable portion of the electric circuit element in correlation with the sensed pressure, the improvement wherein the pick is coupled with the actuator by a mechanism which comprises a crank pivotally mounted about an axis transverse to its positioning by the actuator, the pick is caused to swing in an arc about the pivot axis as the crank is operated by the actuator thereby causing the pick to execute and arcuate motion as it is selectively positioned over the length of the electric circuit element, and an adjusting device is provided to act upon the crank for causing the pick to be set to a nominal set-point position, the crank comprises a pivot which is disposed within an apertured portion of a body portion of the pressure transducer and wherein said adjusting device is disposed on said body portion and acts on said pivot, said adjusting device comprises an adjusting means which is disposed within a further apertured portion of said body portion, said two apertured portions being transversely intersecting and said adjusting device being selectively positionable within said further apertured to act on said pivot to set the nominal set-point position of the pick.

11. The improvement set forth in claim 10 in which said first apertured portion comprises a slot arranged parallel to the first-mentioned axis and having parallel walls spaced apart just slightly greater than the outside diameter of the pivot, said adjusting device comprising means acting on the pivot to react at least a portion of the force exerted on the pivot by the actuator.

12. The improvement set forth in claim 11 in which said further apertured portion comprises a pair of apertures respectively disposed at opposite sides of the point of action of the actuator on the crank, and wherein said adjusting device has respective adjusting portions disposed respectively in said pair of apertures.

13. The improvement set forth in claim 12 in which said adjusting device comprises a first adjusting portion disposed in one of said pair of apertures and a second adjusting portion disposed in the other of said pair of apertures, said first and second adjusting portions being separate parts.

14. The improvement set forth in claim 13 in which each of said adjusting portions is configured for a forceful fit in the corresponding one of said pair of apertures and comprises a first portion disposed to one side of the pivot, a second portion disposed to the opposite side of the pivot and an intermediate portion which bridges said first and second portions and acts on the pivot.

15. The improvement set forth in claim 14 further including a spring bias means for imparting a spring bias to the crank in a sense which resists increasing sensed pressure.

16. The improvement set forth in claim 14 in which each of said pair of apertures has a non-circular transverse shape.

17. The improvement set forth in claim 14 in which said pair of apertures are arranged substantially at right angles to said slot, said intermediate portion of each of said adjusting portions being disposed at an acute angle to the said pair of apertures and to said slot.

18. In a pressure tranducer comprising a pressure sensing port, an actuator which is selectively positionable along a straight linear axis in accordance with pressure sensed at said port, an electric circuit element having a length which is transverse to the positionable motion of the actuator, and a pick which is selectively positionable by the actuator along the length of the electric circuit element to cause the pressure transducer to present an electric circuit characteristic as a selectable portion of the electric circuit element in correlation with the sensed pressure, the improvement wherein the pick is coupled with the actuator by a mechanism which comprises a crank pivotally mounted about an axis transverse to the direction of its positioning by the actuator, the pick is caused to swing in an arc about the pivot axis as the crank is operated by the actuator thereby causing the pick to execute an arcuate motion as it is selectively positioned over the length of the electric circuit element, and an adjusting device is provided to act upon the crank for causing the pick to be set to a nominal set-point position, the crank comprises a pivot which is disposed within an apertured portion of a body portion of the pressure transducer, said adjusting device is disposed on said body portion and acts on said pivot, a further apertured portion extending in said body portion on opposite sides of said first-mentioned apertured portion is included, said adjusting device having respective portion disposed within said further apertured portion on opposite sides of said first-mentioned apertured portion, said adjusting device having an intermediate portion which spans said first-mentioned apertured portion and acts on said pivot, and in which said first and further apertured portions are arranged at a right angle and said intermediate portion of said adjusting device spans said first apertured portion at an acute angle to both of said apertured portions.

19. The improvement set forth in claim 18 in which said further apertured portion comprises two separate apertures and said adjusting device comprises two separate adjusting elements each of which is disposed within a corresponding one of said two separate apertures, each of said adjusting elements having a point of action with the pivot to a respective side of where the actuator acts on the crank.

20. The improvement set forth in claim 19 in which each adjusting element is configured for a forceful fit within the corresponding one of each pair of apertures.

21. In a pressure transducer comprising a pressure sensing port, an actuator which is selectively positionable along a straight linear axis in accordance with pressure sensed at said port, an electric circuit element having a length which is transverse to the positionable motion of the actuator, and a pick which is selectively positionable by the actuator along the length of the electric circuit element to cause the pressure transducer to present an electric circuit characteristic as a selectable portion of the electric circuit element in correlation with the sensed pressure, the improvement wherein the pick is coupled with the actuator by a mechanism which comprises a crank pivotally mounted about an axis transverse to the direction of its positioning by the actuator, the pick is caused to swing in an arc about the pivot axis as the crank is operated by the actuator thereby causing the pick to execute an arcuate motion as it is selectively positioned over the length of the electric circuit element, an adjusting device is provided to act upon the crank for causing the pick to be set to a nominal set-point position, the crank comprises a general cruciform shape having respective crank arm portions disposed radially of the pivot axis and integral pivot portions which are disposed within an apertured portion of a body portion of the pressure transducer and wherein said adjusting device is disposed on said body portion to act on said integral pivot portions.

22. The improvement set forth in claim 21 further including a spring bias means for imparting a spring bias to the crank in a sense which resists increasing pressure, said spring bias means comprising a spring member having a point of operative engagement with one of said crank arm portions.

23. In a pressure transducer comprising a pressure sensing port, an actuator which is selectively positionable along a straight linear axis in accordance with pressure sensed at said port, an electric circuit element having a length, a pick which is selectively positionable by the actuator along the length of the electric circuit element to cause the pressure transducer to present an electric circuit characteristic as a selectable portion of the electric circuit element in correlation with the sensed pressure, the improvement wherein the pick is coupled with the actuator by a mechanism which comprises a crank having a pivot and means constraining the pivot such that the crank is constrained in a pivotal mounting about a pivot axis as the crank is operated by the actuator thereby causing the pick to execute an arcuate motion as it is selectively positioned over the length of the electric circuit element, and said means constraining the pivot comprises a body portion having aperture means within which the pivot is received and an adjusting device is positionable on said body portion in cooperative association with said means constraining the pivot to act upon the pivot for causing the pick to be set to a nominal set-point position.

24. The improvement set forth in claim 23 in which said adjusting device and said body portion are configured such that said adjusting device has a forceful fit on said body portion.

25. The improvement set forth in claim 24 in which said adjusting device comprises a first portion disposed to one side of the pivot, a second portion disposed to the opposite side of the pivot and an intermediate portion which bridges said first and second portions and acts on the pivot.

26. The improvement set forth in claim 25 in which said intermediate portion of said adjusting device is disposed at an acute angle to the direction in which it is positionabe on said body position.

27. In a pressure transducer comprising a pressure sensing port, an actuator which is selectively positionable along a straight linear axis in accordance with pressure sensed at said port, an electric circuit element having a length, a pick which is selectively positionable by the actuator along the length of the electric circuit element to cause the pressure tranducer to present an electric circuit characteristic as a selectable portion of the electric circuit element in correlation with the sensed pressure, the improvement wherein the pick is coupled with the actuator by a crank mechanism which is constrained on a body portion to pivot about a pivot axis as the crank is operated by the actuator thereby causing th epick to execute an arcuate motion as it is selectively positioned over the length of the electric circuit element, and an adjusting device is positionable on said body portion with a forceful fit to act upon said mechanism for causing the pick to be set to a nomical set-point position.

28. In a pressure transducer comprising a pressure sensing port, an actuator which is selectively positiondable along a straight linear axis in accordance with pressure sensed at said port, an electric circuit element having a length, a pick which is selectively positionable by the actuator along the length of the electric circuit element to cause the pressure transducer to present an electric circuit characteristic as a selectable portion of the electric circuit element in correlation with the sensed pressure, the improvement wherein the pick coupled with the actuator by a mechanism which comprises a crank having a pivot and means constraining the pivot such that the crank is constrained on a body portion to pivot about a pivot axis as the crank is operated by the actuator thereby causing the pick to execute an arcuate motion as it is selectively positioned over the length of the electric circuit element, and an adjusting device is positionable on said body portion in cooperative association with said means constraining the pivot to act upon the pivot for causing the pick to be set to a nominal set-point position, said adjusting device comprising an adjusting portion which is positionable generally transverse to the pivot axis and has a portion which is disposed at an acute angle to the generally transverse direction of positioning and which acts upon the pivot.

* * * * *

UNITED STATES PATENT AND TRADEMARK OFFICE
CERTIFICATE OF CORRECTION

PATENT NO. : 4,718,278            Page 1 of 2

DATED : January 12, 1988

INVENTOR(S) : Rudolph Bergsma

It is certified that error appears in the above-identified patent and that said Letters Patent are hereby corrected as shown below:

Column 12, line 18 (claim 2, line 6 of the claim), immediately before "portion" insert --body--;

Column 12, line 39 (claim 5, line 4 of the claim), "wall" should read --walls--;

Column 13, line 26 (claim 10, line 17 of the claim) "and" should read --an--;

Column 14, line 38 (claim 18, line 28 of the claim) "portion" should read --portions--;

Column 16, line 7 (claim 26, line 4 of the claim) "positionabe" should read --positionable--;

Column 16, line 21 (claim 27, line 14 of the claim) "th epick" should read --the pick--;

Column 16, line 25 (claim 27, line 18 of the claim) "nomical" should read --nominal--;

Column 16, line 28 (claim 28, line 2 of the claim) "positiond-" should read --position- --;

UNITED STATES PATENT AND TRADEMARK OFFICE
CERTIFICATE OF CORRECTION

PATENT NO. : 4,718,278

DATED : January 12, 1988

INVENTOR(S) : Rudolph Bergsma

It is certified that error appears in the above-identified patent and that said Letters Patent is hereby corrected as shown below:

Column 16, line 37, (claim 28, line 11 of the claim) immediately before "coupled" insert --is--.

Signed and Sealed this

Thirty-first Day of May, 1988

Attest:

DONALD J. QUIGG

Attesting Officer

Commissioner of Patents and Trademarks